United States Patent [19]
Zukowski

[11] Patent Number: 4,926,423
[45] Date of Patent: May 15, 1990

[54] TIME-DIVISION-MULTIPLEXED DATA TRANSMISSION SYSTEM

[75] Inventor: Charles Zukowski, Yorktown Heights, N.Y.

[73] Assignee: The Trustees of Columbia University in the City of New York, New York, N.Y.

[21] Appl. No.: 252,576

[22] Filed: Sep. 30, 1988

[51] Int. Cl.$^5$ .............................................. H04J 3/00
[52] U.S. Cl. .................................... 370/112; 328/104
[58] Field of Search .................... 370/4, 112; 307/243; 328/104

[56] References Cited

U.S. PATENT DOCUMENTS

| | | | |
|---|---|---|---|
| 4,486,880 | 12/1984 | Jeffery et al. | 370/112 |
| 4,593,390 | 6/1986 | Hildebrand et al. | 370/112 |
| 4,686,674 | 8/1987 | Lam | 370/112 |
| 4,759,018 | 7/1988 | Buchner | 370/112 |

Primary Examiner—Douglas W. Olms
Assistant Examiner—Melvin Marcelo
Attorney, Agent, or Firm—Brumbaugh, Graves, Donohue & Raymond

[57] ABSTRACT

An improved serial data transmission system employs a skewing network to selectively skew each of the plurality of input signals by a successively increasing integral multiple of the average period of the multiplexed output signal. The skewed signals are merged in a combinatorial merging network having substantially identical delay times in its data path, to provide the multiplexed signal. In an exemplary embodiment, the invention provides a time-division multiplexer in which the incoming signals are precoded prior to being skewed by the skewing network, so that the form of the multiplexed output signal is the conventional sequentially interleaved input signals as provided by prior art multiplexers, and the merging network is a binary tree EXCLUSIVE OR gate array. In another exemplary embodiment, the invention provides a multiplexer with a skewing network and a merging network to generate a serial signal, and a corresponding demultiplexer which deskews the serial signal and postcodes the deskewed data to recover the original input signals. The invention eliminates the need for latches capable of operating at the data rate of the output signal, and does not require the generation and distribution of clock signals of higher frequency than the incoming data.

16 Claims, 7 Drawing Sheets

TIME-DIVISION-MULTIPLEXED DATA TRANSMISSION SYSTEM

BACKGROUND OF THE INVENTION

This invention relates to a high-speed serial data transmission system, and more particularly to a serial high-speed data transmission system which uses time-division multiplexing and demultiplexing techniques in which the maximum permissible data transmission rate of the system is not limited by the switching speed or settling time of latches used in the multiplexer and demultiplexer circuits, and which does not require the generation and distribution of a clock signal having a frequency at least as high as half the data transmission rate.

Where a high-bandwidth serial transmission channel is available, it is typical to combine a number of individual lower bandwidth signals for simultaneous transmission over the channel, and to recover the individual signals at the receiving end of the channel. It is known in the art to use a time-division multiplexer to combine the individual signals and a corresponding time-division demultiplexer to recover the individual signals.

A time-division multiplexer is a circuit which provides for the transmission of two or more input signals over a common serial output data path by using successive time intervals for sharing the output data path among the input signals. The basic function of the time-division multiplexer is to couple each signal in sequence to the output data path for a predetermined time interval.

A time-division demultiplexer is a circuit which performs the inverse function of recovering from the serial data transmitted over the data path the individual input signal which were combined and serialized by the time-division multiplexer.

In general, the input signals are distinct serial data streams, which are sampled and interleaved by the time-division multiplexer to provide a single serial data stream at a much higher data rate than the input data streams.

New technological developments have created the desirability for time-division multiplexers with ever increasing maximum output data rate. For example, it is desired to have time-division multiplexers which are capable of combining the parallel data words generated by very-high-speed digital processors for transmission on high speed serial data links. Similarly, it is desired to have time-division multiplexers which can generate a multiplexed output data stream of a high enough data rate to exploit the full potential of new high-bandwidth transmission technologies such as fiber optic or superconductor transmission lines.

Various multiplexer circuit configurations are known in the art, including those disclosed in U.S. Pat. No. 4,486,880 to Jeffrey et al., U.S. Pat. No. 4,593,390 to Hildebrand et al., and U.S. Pat. No. 4,686,674 to Lam. These circuit configurations, and others discussed below, have the problem in that the maximum output data rate is limited by the switching and settling time of various sequential devices such as latches. They also have the problem in that a clock signal of a frequency at least as great as half the output data rate must be generated and routed to some of the circuit elements of the multiplexer.

Referring to FIGS. 1A through 1E, a generic representation of a conventional time-division multiplexer and a variety of known time-division multiplexer circuit configurations are shown. In each example four data lines designated D0, Dl, D2, and D3 are shown entering the time-division multiplexer at the left, and a multiplexed output Y is shown leaving the time-division multiplexer at the right.

In FIG. 1A, a simplified generic multiplexer is shown. Selector 10, shown generically as a switch having four positions, equal to the number of inputs, sequentially connects the four input signals D0–D3 to the output Y in a cyclic fashion. If each of the inputs has a data rate characterized by a period T, the selector may cycle through the four switch positions in the period T, selecting each of the inputs for an interval of duration T/4. The output signal, under these circumstances, has a data rate characterized by a period of T/4.

In FIG. 1B, four D-type flip-flops and three 2-to-1 multiplexers are cascaded to multiplex four data streams D0–D3 into one data stream at the output Y. At the moment when the data value present at output Y is a data value of D0, the 2-1 multiplexer 11 is selecting data line D0. After the passage of an interval T/4, the data value present at output Y will be determined by the data value of Dl, which data value has been delayed relative to the data value of D0 by the D-type flip-flop 12. After the passage of another interval T/4, the data value present at output Y will be determined by the data value of D2, which data value has been delayed relative to the data value at D0 by its passage through two D-type flip-flops 13 and 12. In a similar manner the data value of D3 will eventually become the data value at output Y, and the process is repeated for four more values of D0 through D3.

FIG. 1C shows another known time-division multiplexer circuit 101. Data lines D0 through D3 are respectively provided to AND gates 14. Pulse generator 15 generates gating signals $\phi 1$ through $\phi 4$ related as shown in the timing diagram 102 of the figure. Each gating signal $\phi 1$–$\phi 4$ has a duty cycle of nominal 25%, such that at a given instant only one of the four gating signals $\phi 1$–$\phi 4$ is high. If the data rate at the inputs is characterized by a period T, a given gating signal $\phi$ is high for a duration of T/4. For example, during the time that $\phi 1$ is high, the data value of D0 determines the data value at output Y. Gating signal $\phi 2$ goes high as $\phi 1$ goes low, and the value of Dl becomes the data value at output Y, and so on through the input lines.

FIG. 1D shows a known time-division multiplexer circuit configuration 103 having a timed tree structure. Counter 16 generates control signals so that each of 2-1 multiplexers 17 selects one of its two inputs, and the 2-1 multiplexer 18 selects one of its two inputs, which are the outputs of the multiplexers 17.

Each of these time-division multiplexer circuit configurations of FIGS. 1B–1D has the drawbacks mentioned above. In the time-division multiplexer of FIG. 1B, for example, a clock signal CLK with a period of T/4 must be generated and distributed to at least four circuit elements. This clock signal, with a frequency corresponding to the output data rate, imposes severe design and layout constraints as the output data rate is increased. Additionally, each D-type flip-flop, including flip-flops 12 and 13, and each 2-1 multiplexer, including multiplexer 11, has to be fast enough to switch and settle within the period of the CLK signal. Depending on the output data rate required, sufficiently fast flip-flops and multiplexers may be expensive or unavailable.

In the time-division multiplexer of FIG. 1C, the pulse generator 15 has to generate the multiplexer control signals $\phi 1$–$\phi 4$, each of which must rise and fall in period T/4. The circuit path carrying each of the multiplexer control signals $\phi 1$–$\phi 4$ is subject to severe design and layout constraints. Not only must the circuit elements in the pulse generator 15 switch and settle faster than time T/4, but the gates 14 must also switch and settle that quickly. As in the previous example, the maximum output data rate achievable is limited by the speeds of the flip-flops of the pulse generator 15 and the gates 14 and 106 making up the selector circuit.

In the time-division multiplexer of FIG. 1D, the maximum output data rate achievable by the whole circuit is limited by the maximum clock rate of the counter 16 and the maximum switching speed of the 2-1 multiplexer 18. As in the previous examples, at least one of the multiplexer control signals, in this case the signal 19 controlling multiplexer 18, necessarily has a frequency as high as that of the output data. In some instances, the clock signal CLK itself may be used as the control signal 19 applied to the multiplexer 18 to allow a reduction in the frequency of clock signal CLK by a factor of two. However, the problems of generating and distributing such a high-frequency signal may impose a practical limit on the maximum output data rate of the multiplexer 103.

Where the maximum output data rate of a particular time-division multiplexer is limited by the switching and settling time of circuit elements used in the time-division multiplexer, one way to increase such output data rate is by employing faster circuit elements. For example, improvements may be achieved by using gallium arsenide technology instead of conventional silicon technology, or by using bipolar rather than MOS circuit elements. However, even with the fastest semiconductor technologies, known time-division multiplexer circuit configurations may not be fast enough to fully exploit the advances in data transmission line technology.

At the receiving end of the serial data channel, it is necessary to demultiplex the data to recover the original input signals that were combined by the multiplexer. Where the signals were combined by a conventional time-division multiplexer, the demultiplexing may be performed, for example, by a circuit such as that shown in FIG. 1E.

Referring now to FIG. 1E, the incoming serial data at input Y is supplied to the input of the first stage of a four stage shift register formed by four D-type flip-flops 14′. Each of the D-type flip-flops 14′ of the demultiplexer 104 receives a common high-speed clock signal $\phi$, which may be derived from the incoming serial data stream at input Y or received from the source of the incoming data. Successive data values of the incoming serial data stream at the input Y are latched by the first stage and progressively shifted to subsequent stages of the shift register each time the clock signal $\phi$ goes high. In this way each of the data values of the input signals D0–D3 which were combined by the multiplexer are made available at the outputs of corresponding flip-flops 14′.

However, the same drawbacks of known multiplexer circuit configurations discussed above are also present in known time-division demultiplexer circuits. So a data transmission system composed of known multiplexer and demultiplexer circuits suffers from the disadvantage of these drawbacks.

Thus, there clearly is a need for a time-division multiplexed data transmission system that avoids the limitations imposed by slow switching and settling times of latches and other logical components, and avoids the problem of having to generate and distribute a clock signal of a frequency as great as the output data rate of the multiplexer.

SUMMARY OF THE INVENTION

The problems of the prior art, as discussed above, are substantially overcome by the present invention which in one aspect is a time-division multiplexer comprising a precoding circuit having a plurality of sequentially ordered channels each corresponding to an input signal to be multiplexed. Each channel except the first one inverts the data value of its corresponding input signal if within a period of a sampling clock, the data value of the corresponding input signal is different from that of the input signal corresponding to a preceding channel. The first channel inverts the data value of its corresponding input signal if during the period of the sampling clock the data value of the input signal corresponding to the first channel is different from that of the previous period of the sampling clock. Alternatively, the first channel of the precoding circuit inverts the data value of its corresponding input signal if such data value during a period of the sampling clock is different from the parity of all the data values provided by the precoding circuit during that period.

The data values provided by each channel of the precoding circuit are provided to a skewing circuit which samples such data values. The sampling rate of the data values provided by each channel of the precoding circuit is the same as that of the sampling clock. However, the sampling intervals of the data values provided by each channel, except the first channel, is skewed with respect to the sampling intervals of the data values provided by a preceding channel by a common predetermined interval. In this manner, the skewing circuit provides samples of the data values provided by the precoding circuit, in which the sampled data value corresponding to each channel of the precoding circuit is skewed with respect to that of a preceding channel of the precoding circuit. The skewed samples of the data values provided by the precoding circuit are received by a merging circuit having a single output. The data value at the output of the merging circuit changes state whenever any one of the skewed data value samples received by the merging circuit changes its state. The merging circuit is designed such that the total gate delay from any input of that circuit to the output of that circuit is substantially the same.

According to an exemplary embodiment of the foregoing time division multiplexer, each channel of the precoding circuit comprises a two input EXCLUSIVE OR gate which provides its output to the input of a T-type flip-flop. Each T-type flip-flop receives the sampling clock and provides a data value of the precoding circuit corresponding to a particular input signal. The EXCLUSIVE OR gate of each channel of the precoding circuit, except for the first channel, receives the input signal corresponding to the channel and the input signal corresponding to the preceding channel. The EXCLUSIVE OR gate of the first channel receives the input signal corresponding to the first channel and either the data value of the input signal corresponding to the last channel delayed by one period of the sampling clock or the parity of the data values provided by the precoding circuit during the same period of the sampling clock.

The skewing circuit according to the exemplary embodiment comprises a D-type flip-flop corresponding to each channel of the precoding circuit. Each of the D-type flip-flops has an input receiving the data value of the corresponding channel of the precoding circuit, a clock input for receiving a respective clock signal and an output for providing the skewed sample of the data value provided by the corresponding channel of the precoding circuit. The clock signal received by each of the D-type flip-flops has the same frequency and pulse duration as the sampling clock but, except for the flip-flop corresponding to the first channel, is delayed from the clock signal received by the D-type flip-flop corresponding to a preceding channel of the precoding circuit by the common predetermined interval. The clock signal received by the last D-type flip-flop of the skewing circuit is the sampling clock itself.

The merging network according to the exemplary embodiment is a binary tree of EXCLUSIVE OR gates each having substantially the same gate delay. In this exemplary embodiment, the number of input signals received by the time division multiplexer is equal to some power of two and the frequency of the sampling clock is the average output data rate of the multiplexer divided by the number of input signals received by the multiplexer.

Another aspect of the present invention is a time-division-multiplexed serial data transmission system in which the time division multiplexer comprises a skewing circuit as described above which receives the input signals directly and a merging circuit as described above receiving the output of the skewing circuit. The demultiplexer of the system comprises a deskewing circuit which receives the serial data time-division multiplexed by the foregoing skewing and merging circuits and includes a plurality of sequentially ordered sampling circuits each corresponding to a respective one of the input signals. Each of the sampling circuits provides a sample of the serial data signal taken during respective periodic sampling intervals. The sampling intervals of each sampling circuit is skewed by the common predetermined interval with respect to the sampling interval of a preceding sampling circuit. The output of each sampling circuit of the deskewing circuit is received by a postcoder circuit having a plurality of sequentially ordered channels each corresponding to a respective one of the input signals. Each channel of the postcoding circuit, except for the first channel, inverts the data value provided by the corresponding sampling circuit of the deskewing circuit whenever the data value of the corresponding sampling circuit and the data value of the preceding sampling circuit are different during the same sampling interval. The first channel of the postcoding circuit inverts the data value provided by the corresponding sampling circuit of the deskewing circuit whenever the data value provided by the corresponding sampling circuit during a particular sampling interval and the data value provided by the same sampling circuit during a preceding sampling interval are different.

In an exemplary embodiment, the deskewing circuit comprises a plurality of D-type flip-flops, each corresponding to a particular one of the input signals. Each D-type flip-flop includes an input connected to receive the serial time-division-multiplexed data, a clock input for receiving a respective clock signal and an output. The deskewing circuit of the exemplary embodiment also includes a plurality of D-type flip-flops each corresponding to a particular one of the input signals. Each D-type flip-flop has an input connected to the output of a corresponding D-type flip-flop, a clock input for receiving a common clock signal and an output for providing the demultiplexed data. The clock signals received by each of the D-type flip-flops each have a frequency substantially equal to the data rate of the time-division-multiplexed data divided by the number of input signals, and, except for the clock signal received by the first D-type flip-flop, is skewed with respect to the clock signal received by a preceding D-type flip-flop by the common predetermined interval. The common clock signal received by each of the D-type flip-flops of the deskewing circuit is the same as the clock signal received by the first D-type flip-flop. The postcoder circuit of the exemplary embodiment is essentially the same as the precoder circuit described above.

A third aspect of the present invention is a time-division-multiplexed serial data transmission system in which the multiplexed serial data is generated in the manner described above using the combination of a skewing circuit and a merging circuit. However, the demultiplexer comprises a midcoder circuit coupled to receive the serial multiplexed data and samples such data at periodic sampling intervals, the sampling intervals being substantially equal to the period of the serial multiplexed data. The midcoder circuit provides one logic state when the data value at its input during a particular sampling interval and the data value at its input during a preceding sampling interval are different. Otherwise, the midcoder circuit provides another logic state at its output. The output of the midcoder circuit is received by a deskewing circuit which differs from that described above in that the flip-flops which receive the serial data are T-type instead of D-type.

In an exemplary embodiment, the midcoder circuit comprises a first D-type flip-flop having a D input coupled to receive the serial multiplexed data, a clock input for receiving a clock signal and an output; a second D-type flip-flop having a D input coupled to the output of the first D-type flip-flop, a clock input for receiving the same clock signal as the first D-type flip-flop and an output; and a two input EXCLUSIVE OR gate having one input coupled to receive the output of the first D-type flip-flop, a second input coupled to receive the output of the second D-type flip-flop and an output for providing the output signal of the midcoder circuit.

BRIEF DESCRIPTION OF THE DRAWINGS

The present invention will be better understood from the following detailed description of the exemplary embodiments thereof taken in conjunction with the accompanying drawings in which.

Throughout the Figures of the drawings, the same reference numerals and characters are used to denote like components, parts and features.

DETAILED DESCRIPTION OF THE INVENTION

Figure 2:
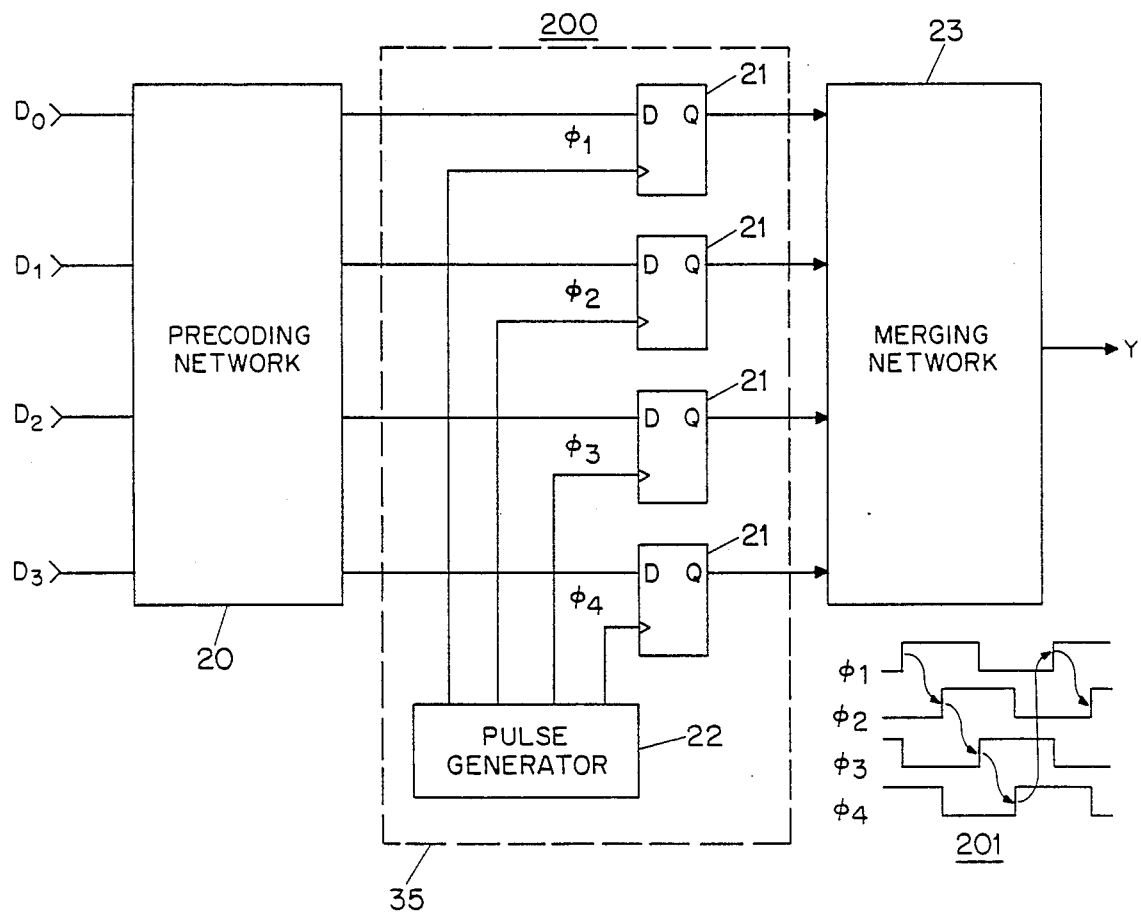
FIG. 2 illustrates the circuit configuration of a time-division-multiplexer according to an exemplary embodiment of the invention, including a precoding network, a merging network and a skewing network including the wave forms of the clock signals of the skewing network.

FIG. 2 shows the time-division multiplexer 200 according to an exemplary embodiment of the invention. Data signals D0 though D3 pass first through a precoding network 20. The data values provided by the precoding network 20 are skewed by a skewing network 35 having D-type flip-flops 21, each of which is gated by its own clock signal $\phi 1-\phi 4$. The clock signals $\phi 1-\phi 4$ are generated by a pulse generator 22, and the phase relationships between $\phi 1-\phi 4$ are shown in the waveform diagram 201 of FIG. 2.

The skewed precoded data values from the D-type flip-flops 21 of the skewing network then pass to a merging network 23, which derives the output signal Y.

Although the exemplary embodiment of the multiplexer 200 has a skewing network 35 in which a single D-type flip-flop is used to provide the appropriate skewing for each data signal provided by the precoding network 20, it will be recognized by those skilled in the art that the skewing of each data signal may be accomplished by using multiple stages of flip-flops to provide the desired skewing of the signal in a gradual manner. Using multiple stages of flip-flops in the skewing network 35 would provide the advantage of avoiding any limitation on the maximum output data rate of the multiplexer 200 arising from latch delays of the flip-flops used in the skewing network 35.

An advantageous feature of the time-division multiplexer in accordance with the invention is that the input signals, each of which has period T, merge naturally through a combinatorial logic circuit merging network 23 into a single output signal of period T/4. The function and an exemplary structure of the merging network 23 is shown in greater detail in FIG. 3. Data streams 24 represent the signal levels present in the lines running from D-type flip-flops 21 to the merging network 23. It is noted that the order of the data streams 24 is arbitrary and may be permuted. Merging network 23, shown in this figure as a binary tree array of EXCLUSIVE OR gates, combines signals 24 into a serial output signal 25 of higher speed than the data streams 24. The output signal is provided at the output Y of the multiplexer 200 of FIG. 2.

Figure 3:
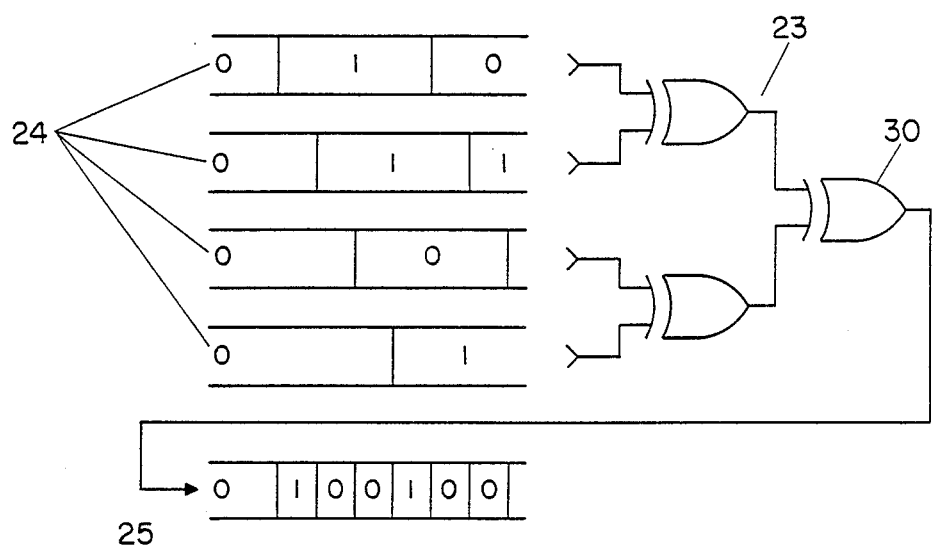
FIG. 3 illustrates the construction and operation of a merging network comprising a binary tree of EXCLUSIVE OR gates.

For simplicity of illustration, the graphical superposition of the input signals 24 (input to the merging network 23) and output signal 25 in FIG. 3 ignores the propagation delays of the EXCLUSIVE OR gates of merging network 23. As will be seen below, such delays, though present, do not limit the maximum possible output data rate. However, the merging network 23 must be designed such that the propagation delay between each input thereof and the output Y be substantially equal.

The merging network 23 is a combinatorial network. Therefore, no clock signals are needed. Each of the changes in data value at output 25 is the result of a change in a particular one of the input signals 24. Each time any one of the input signal values 24 changes, the output value 25 changes. The function of the merging network 23 may be thus defined. It will be known to those skilled in the art that the function of the merging network 23 is that of the well-known parity circuit. In the example of FIG. 3, the output of the parity circuit (even parity) is "1" if an odd number of the inputs have the value of "1". Otherwise, the output is a "0".

Figure 1A:
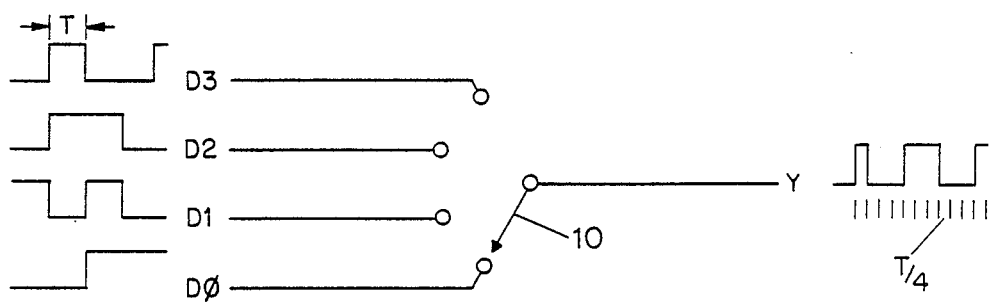
FIG. 1A schematically illustrates the generic time-division-multiplexing function.
Figure 1B:
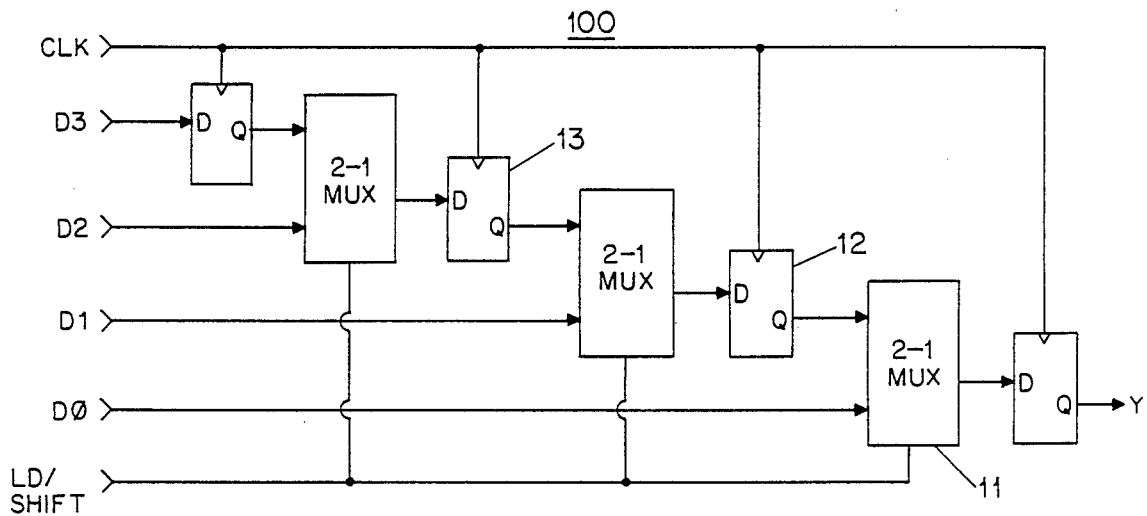
FIGS. 1B–1E illustrates several known time-division multiplexer circuit configurations and a typical known time-division-demultiplexer circuit configuration.
Figure 1C:
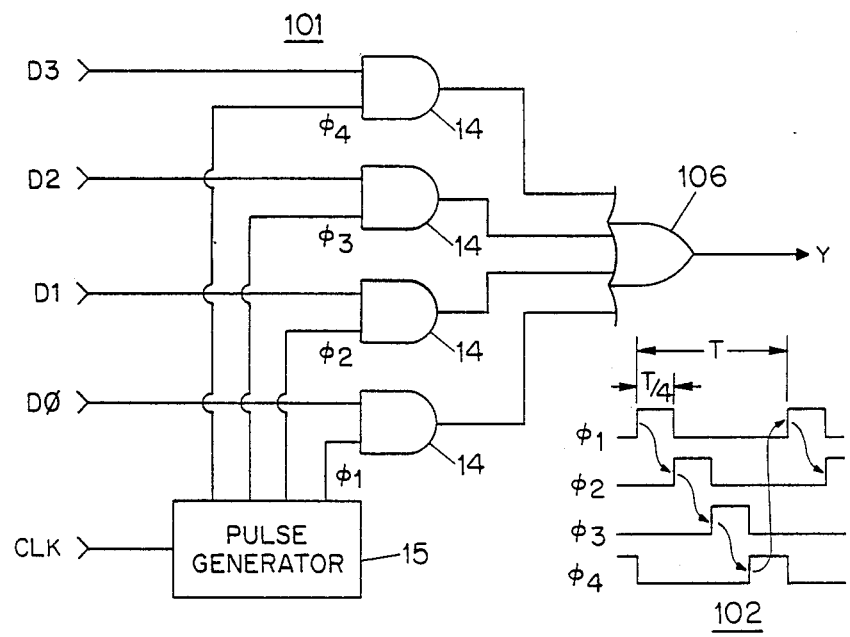
Figure 1D:
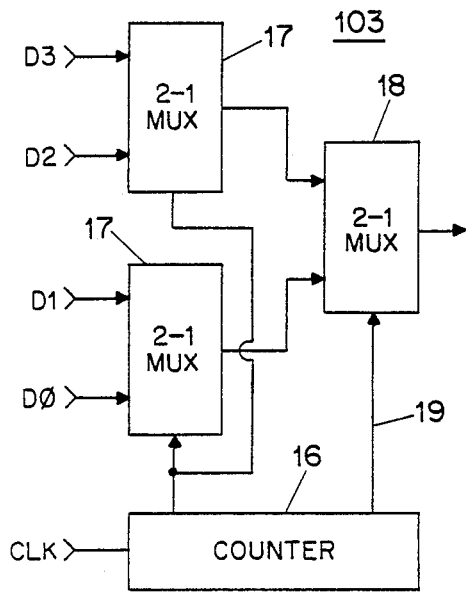
Figure 1E:
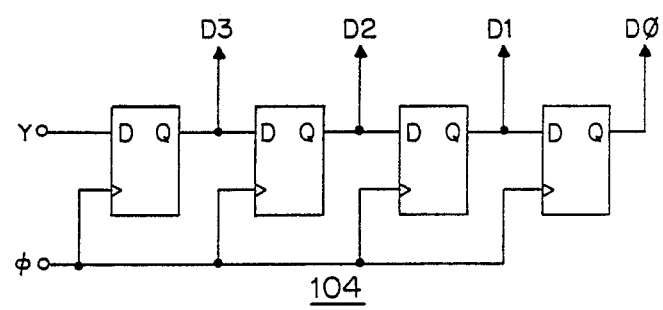

Each of the signals 24 has a characteristic period of T. No clock signal is needed at all within the merging network 23. The clock signals $\phi 1-\phi 4$ of the skewing network each have a period of T, and the rise and fall transitions of each are separated by an interval T/2. In contrast, the multiplexer control signals $\phi 1-\phi 4$ in the time-division multiplexer of FIG. 1C, for example, have rise and fall transitions separated by a shorter interval of T/4. Thus, the D-type flip-flops 21 of the multiplexer of FIG. 2 need only switch and settle quickly enough to keep up with the clock signals $\phi 1-\phi 4$.

The pulse generator 22 generates the low-frequency clocks $\phi 1$ through $\phi 4$ that are used by the flip-flops 21 to perform the data skewing. The transitions in the clocks $\phi 1$ through $\phi 4$ must be accurately spaced with respect to one another to maximize the frequency at which the circuit can operate. In one embodiment, these clocks are generated independently and are carefully tuned. In the alternative, a tapped, tunable ring oscillator may be used, with the oscillator frequency-locked to the average frequency of the incoming data.

To accomplish time-division multiplexing of the incoming data in the conventional sense, the input signals D0 through D3 must first be "precoded" in such a way that when later combined by the merging network 23, the output of the network 25 will be the conventional time-division multiplexed form of the incoming data D0 through D3.

Figure 4A:
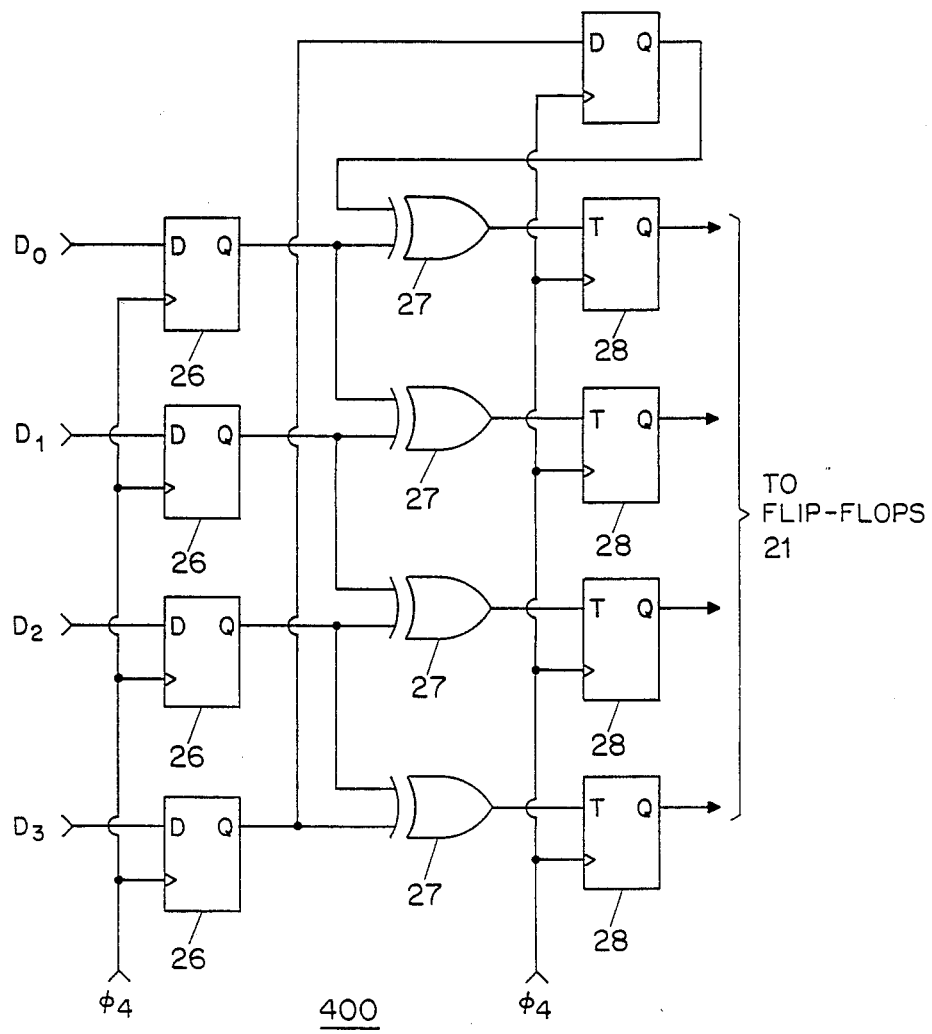
FIGS. 4A and 4B illustrates in greater detail the precoding network of the time-division multiplexer according to an exemplary of the invention.

Such precoding may be accomplished, for example, by the circuit of FIG. 4a. The first stage of the precoder comprises D-type flip-flops 26 and EXCLUSIVE OR gates 27 for comparing adjacent incoming data to detect desired output transitions. If an output transition is desired, a corresponding T-type flip-flop 28 is forced to provide a corresponding input transition. The T-type flip-flop "toggles" its output (changes the output to "1" if the present state is "0", and vice versa) in response to an input of "1", or leaves its output unchanged in response to an input of "0". That transition, when gated through corresponding flip-flop 21 to merging network 23, gives rise to the desired logic state change in the output Y.

When the precoding network is employed, a multiplexer according to the invention produces a time-division-multiplexed output signal of the conventional sequentially interleaved form. For example, a "1" in a particular position in the output signal represents a "1" in a particular input, and a "1" in the subsequent position in the output signal indicates that there was a "1" in the next input. Since a demultiplexer of the conventional type expects a data stream in which the input data is so interleaved, a multiplexer according to the invention must include such a precoding network.

In some applications, however, the multiplexer and demultiplexer are to be used in pairs, and the particular manner of multiplexing need not be restricted to the interleaving of input data in the conventional sequence. In such instances, the precoder of the multiplexer in accordance with the invention may be dispensed with, and the incoming data need merely be latched and skewed before being merged. However, the demultiplexer in accordance with the invention must then perform a postcoding function analogous to the abovementioned precoding function to recover the original input data streams.

Figure 4B:
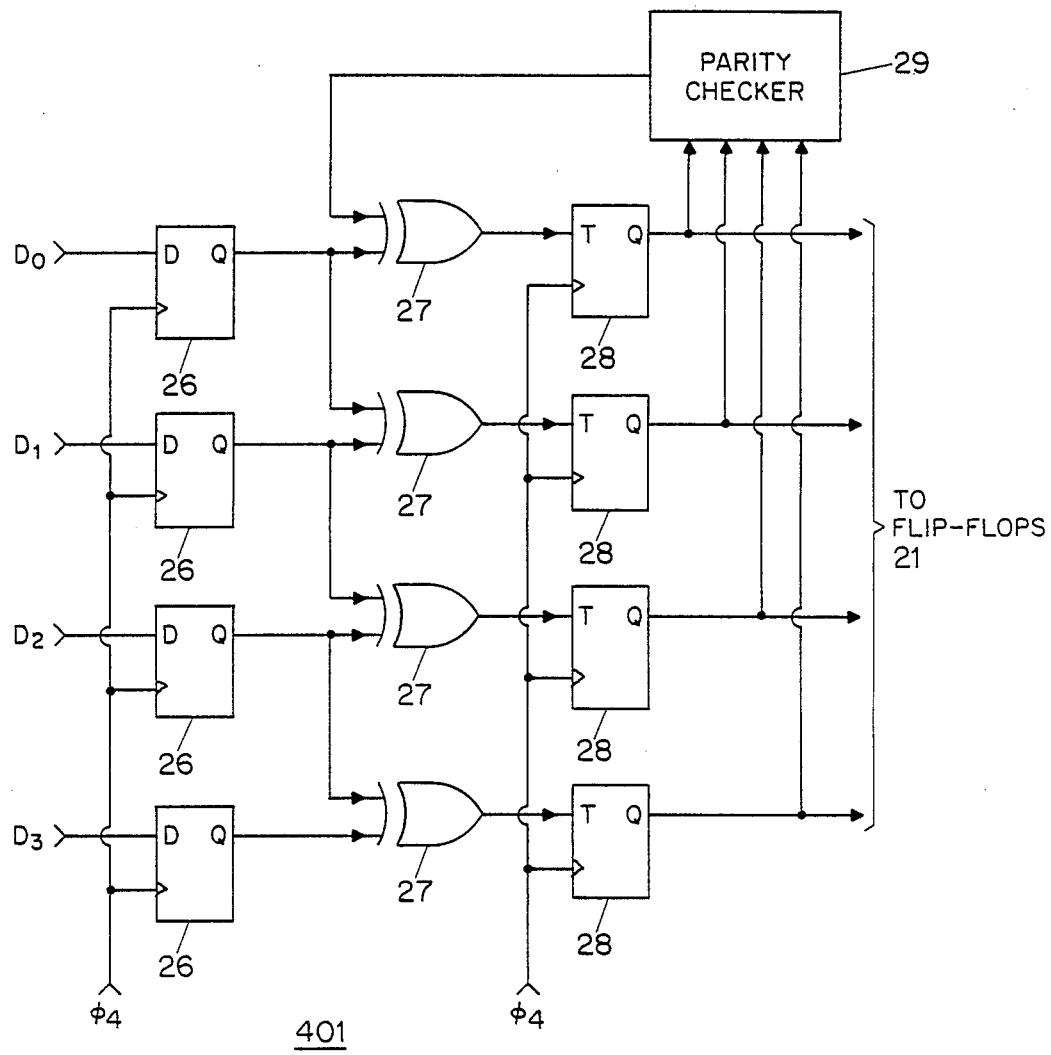

It should be noted that an occurrence of a transient error (e.g., as caused by a power supply spike or other glitch) in any of the T-type of the flip-flops 28 of the precoding network could cause the output of the merging network 23, and hence the output of the time-division multiplexer, to suddenly become inverted after the error. To avoid this potential problem, the precoder network 401 of FIG. 4B shows a precoder analogous to that of FIG. 4A, but with a second stage of processing. A parity checker circuit 29 receives as its inputs the outputs of the T-type flip-flops 28, and calculates an output that is 1 if an odd number of the inputs have the value 1, and is 0 otherwise. The output of parity checker 29 is provided as an input to the EXCLUSIVE OR gate 27 associated with input D0. Regardless of the states of the T-type flip-flops 28 during the previous cycle of clock signal $\phi 4$, the incoming data just latched into the first stage of flip-flops 26 will generate the correct transitions to regenerate that incoming data in the output data stream Y.

It is noted that in the precoder network 401 of FIG. 4B, neither the D-type flip-flops 26 nor the T-type flip-flops 28 has to switch or settle any faster than the incoming data itself, which has an average period T. Each of the aforementioned flip-flops is clocked by $\phi 4$, which signal has a period of T. The parity checker 29 likewise needs only calculate parity once every period of the clock signal $\phi 4$.

Referring again to FIG. 2, each of the D-type flip-flops 21 of the skewing network need only switch and settle at a rate corresponding to their respective clock signals $\phi 1-\phi 4$, each of which has a period T.

Referring again to FIG. 3, the last gate 30 of the merging network must switch quickly enough to generate the output data stream having an average period T/4. As discussed below, the gate 30, and the other gates of merging network 23, are EXCLUSIVE OR gates which may be laid out in an integrated circuit chip to take advantage of certain symmetries that enable the gates to have matched switching speeds.

The drawback of prior art time-division multiplexer circuit configuration of requiring the generation and distribution of a clock signal with a period equal to the average period of the output data (e.g., T/4), is absent in the time-division multiplexer in accordance with the invention. Four clock signals $\phi 1$ through $\phi 4$ are required, but each need only have a period of T (i.e., the average period of the output data divided by the number of inputs).

The advantages enjoyed by the time-division multiplexer in accordance with the invention over those of the prior art are typically a factor of four in the examples discussed above. It should be understood, however, that where the number of inputs to be multiplexed is some number n other than four, the relative advantage is typically a factor of n.

Figures 5A, 5B:
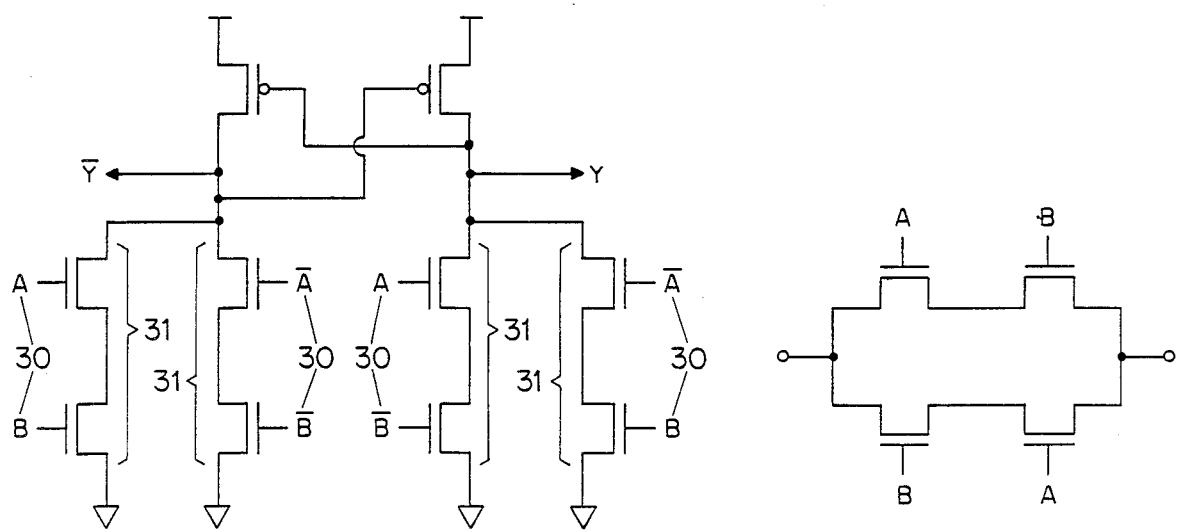
FIGS. 5A and 5B is a schematic diagram of a CMOS implementation of an EXCLUSIVE OR gate suitable for use in the merging network of FIG. 3.

As may be appreciated from the timing relationships of the input signals 24 and output signal 25 shown in FIG. 3, it is necessary that the data paths between an input and the output through the merging network 23 must all have nearly identical delays. Even a slight difference in the delay associated with any two of the data paths would give rise to irregularity in the multiplexed time slots of output signal 25. FIG. 5A is the schematic diagram of an advantageous CMOS implementation of an EXCLUSIVE OR gate of the merging network. The gate has two inputs A and B, and requires that other circuitry (not shown) provide the inverse input signals $\overline{A}$ and $\overline{B}$ as well. The gate yields the EXCLUSIVE OR output Y and its complement $\overline{Y}$. The EXCLUSIVE OR gate circuit of FIG. 5A is quite symmetric, since each input signal 30 drives the same load as the other input. There are four transistor pairs 31. The enhancement shown in FIG. 5B may be used in place of each transistor pair 31 to provide further improvement in the matching of delays along each of the data paths of the merging network.

As shown in FIG. 3, one circuit configuration which may be employed to accomplish the merging function is a binary tree array of EXCLUSIVE OR gates. The state changes in the signals to be merged do not pass through the gates instantly, since there is a delay involved with the passage of a signal through each gate. Nothing in the function of the multiplexer, however, requires that the data rate period of the multiplexed output data be longer than the delay time associated with passage through the merging network. On the contrary, it is possible to "pipeline" the merging network such that a change of state can be entering one of the first gates in the network even as a previous change of state is passing through the network.

Figure 6:
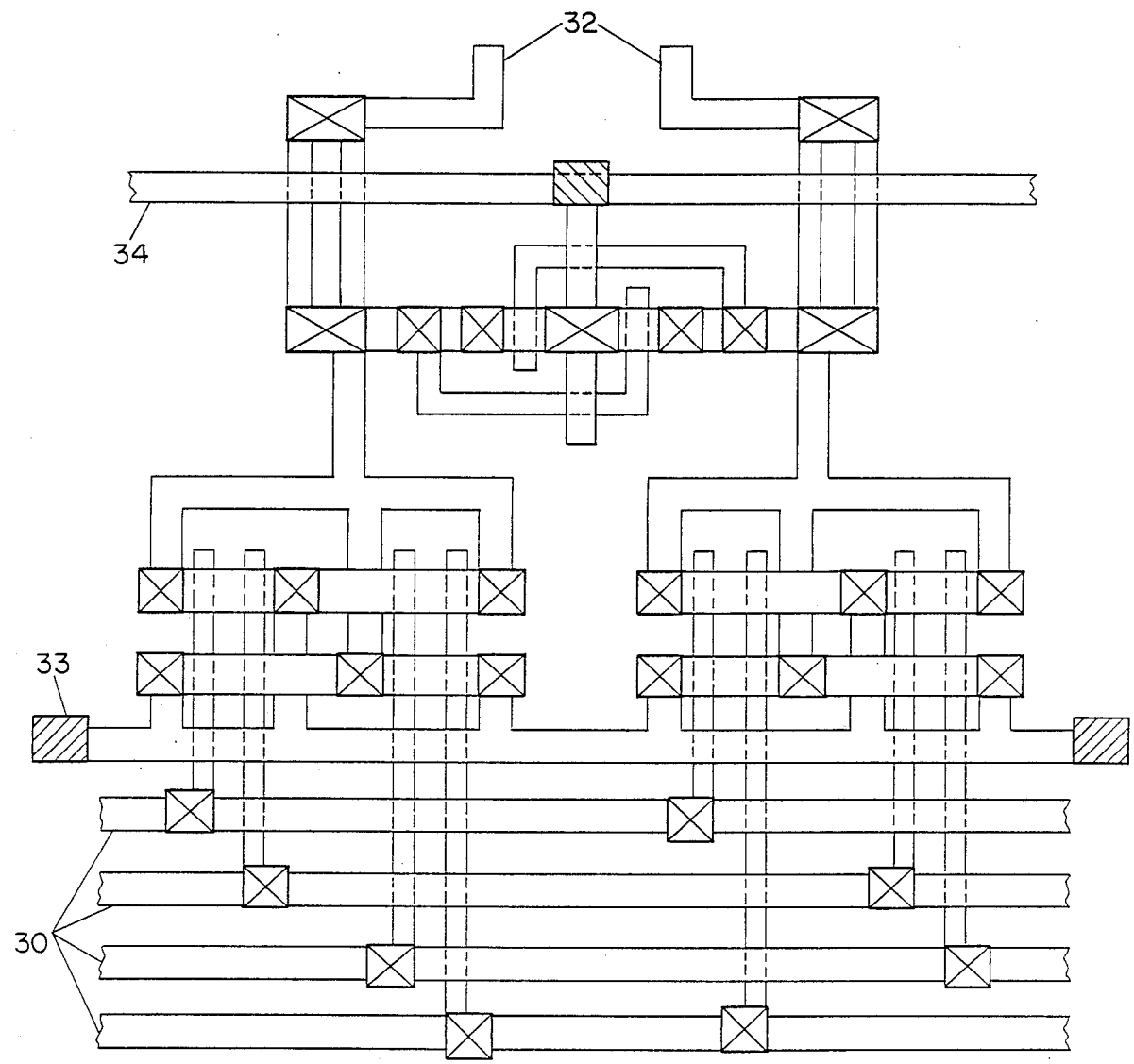
FIG. 6 illustrates a CMOS integrated-circuit layout diagram of an EXCLUSIVE OR gate suitable for use in the merging network of FIG. 3.

FIG. 6 shows an integrated circuit layout of an exemplary EXCLUSIVE OR gate of the merging network 23 in CMOS technology. The signal routings are such that parasitics are matched among the various data paths. Input signals 30 are collected on horizontal metal lines along the bottom. Outputs 32 at the top are provided on polysilicon lines to the horizontal metal lines of the next stage. The metal input lines 30 are extended sideways so that each gate in the entire merging network, including interconnect, is identical in size. The metal input lines 30 can remain completely horizontal until the number of inputs to the merging network reaches sixteen, at which point bends must be added to the input lines. The polysilicon output lines 32 consist of a pair of lines so that the amount of polysilicon in each connecting line is identical, even when shrinking or growing of the polysilicon layer occurs as a result of photolithographic or processing variations. The power connection 33, 34 to the cell is extended completely across the cross-coupled pull-up connection to insure matching even under misalignment.

In the layout of FIG. 6, each transition propagating through the merging network consists of two changing signals, one rising and one falling. For example, if the signal A is to be propagated, it is carried by conductors representing both A and $\overline{A}$, the inverse of A. The only difference between a 0-1 transition and a 1-0 transition is the order, since each transition contains a rising and a falling waveform. As a result, a mismatch in voltage rise and fall times will not contribute to a transition delay mismatch as long as the difference is consistent across the network. This principle is also used in the latches 21, where a double latch generates each polarity independently. As a result, the latch does not need to produce equal rise and fall times to generate transitions with uniform speed.

Figure 7:
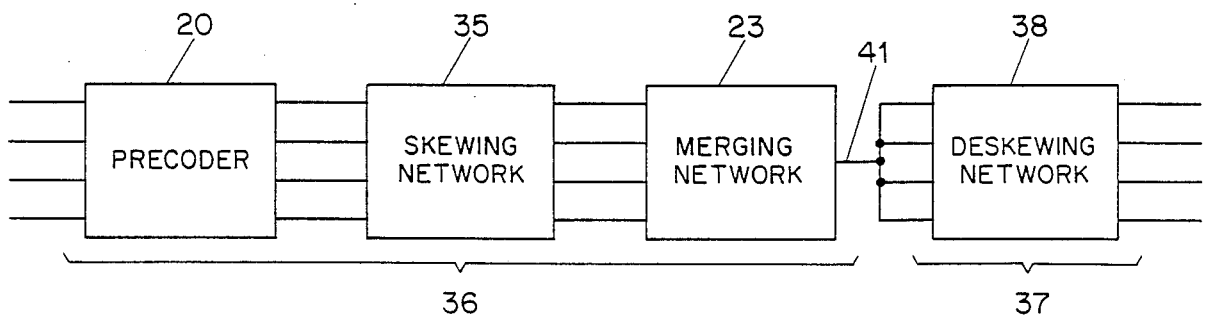
FIG. 7 shows a functional block diagram of a time-division-multiplexed serial data transmission system according to one exemplary embodiment of the invention.

The time-division multiplexer of the invention, such as that depicted in FIG. 2, is shown in combination with a demultiplexer in functional block diagram form in FIG. 7. Precoding network 20, skewing network 35, and merging network 23 together comprise a multiplexer 36 providing a conventional time-division-multiplexed serial data stream to a high speed serial data path 41. The demultiplexer 37 receives the serial data stream from the data path 41 and extracts the four (in this example) individual data signals.

The demultiplexer 37 in this example may be any conventional demultiplexer of the type used with conventional time-division multiplexers. Well-known high-level software conventions are used to perform error-checking and error-correction, and to identify each of the four data channels from among the received data stream.

Figure 8:
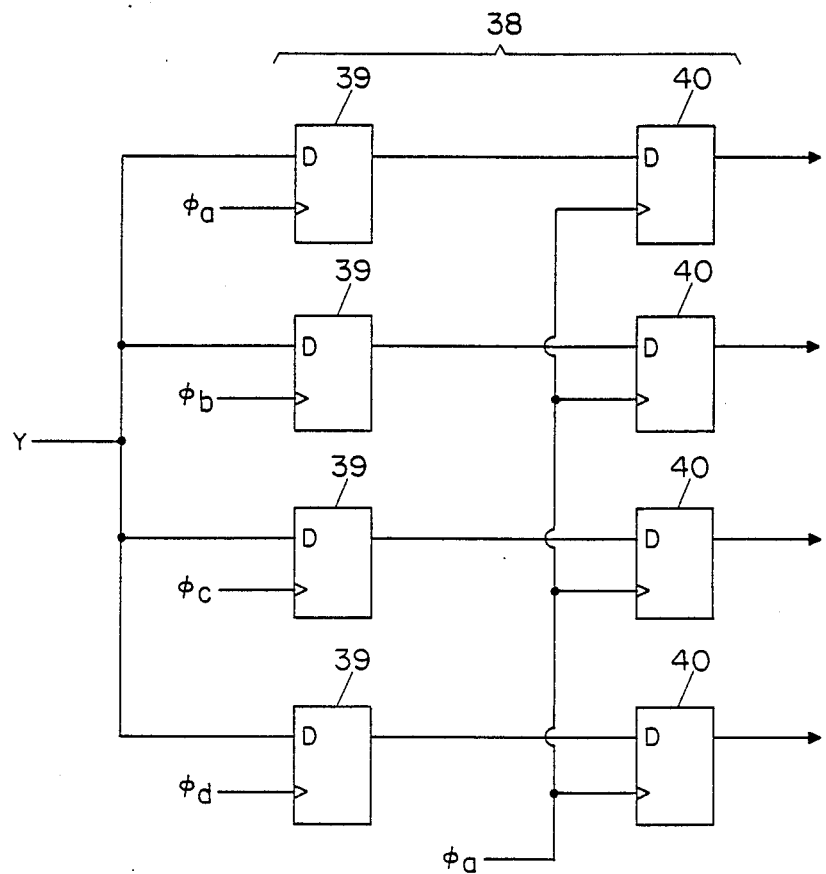
FIG. 8 shows a deskewing network suitable for use in the time-division-multiplexed serial data transmission system of FIG. 7.

One circuit which may be used as the demultiplexer 37 is the deskewing network 38 shown in detail in FIG. 8. Four low-speed clock signals $\phi a$, $\phi b$, $\phi c$, and $\phi d$ clock the D-type flip-flops 39 to accomplish the deskewing function required to extract each of the four input data signals. The deskewing function of the D-type flip-flops 39 is the inverse of the skewing network 35 of the multiplexer 36.

Depending on the characteristics of the device receiving the four data streams, additional gating may be needed as provided by the D-type flip-flops 40.

As mentioned above, in the case where the multiplexer and the demultiplexer are to be used as a pair, it is not necessary that conventional sequential interleaving of the input signal be performed as provided by the precoding network 20 in the multiplexer of FIG. 7. The invention offers a generalized multiplexing/demultiplexing technique which may be adjusted to optimize any of a number of possible design requirements. For example, where size, power or other constraints limit what can be included in the multiplexer, the appropriate coding may be carried out in the demultiplexer as "postcoding" as shown in FIG. 9, or as "midcoding" as shown in FIG. 10A.

Figure 9:
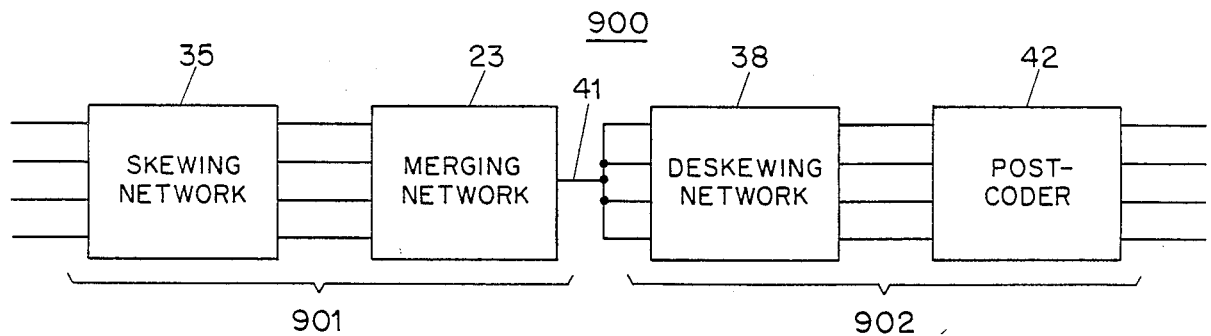
FIG. 9 shows a functional block diagram of a time-division-multiplexed serial data transmission system according to another embodiment of the invention.

In FIG. 9, the multiplexer 901 comprises the skewing network 35 and merging network 23. Serial data stream path 41 provides the high-bit-rate data to a demultiplexer 902 comprising a deskewing network 38 and a postcoder network 42. As in the case of conventional multiplexer/demultiplexer systems, well-known high-level software conventions can perform error detection, error correction, and identification of the four data channels at the output.

In the data transmission system 900 of FIG. 9, the deskewing network 38 may be the circuit depicted in FIG. 8. The postcoder may be identical in construction to the precoder of FIG. 4A.

Figure 10A:
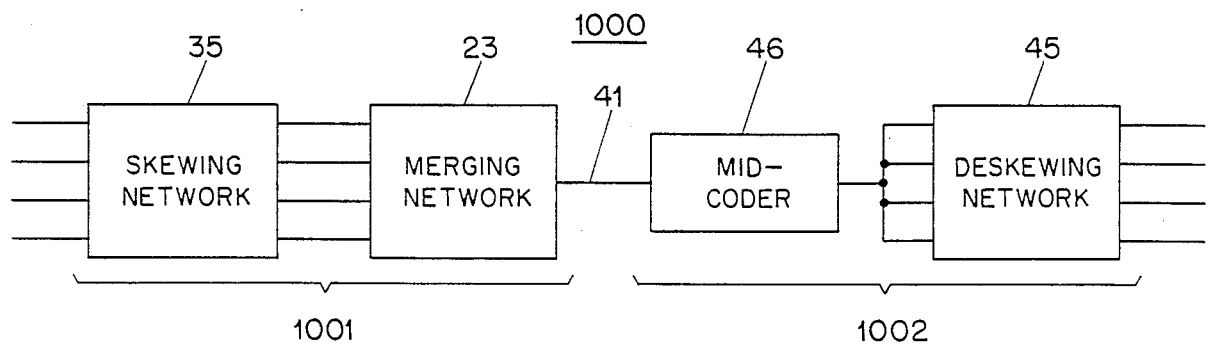
FIG. 10A shows a functional block diagram of a time-division-multiplexed serial data transmission system according to yet another exemplary embodiment of the invention.

In the "midcoder" configuration for the data transmission system 1000 of FIG. 10A, the multiplexer 1001 includes only the skewing network 35 and merging network 23 as in FIG. 9. The demultiplexer 1002 has a "midcoder" network 46, such as the example shown in FIG. 11A comprising two D-type flip-flops 43 and an EXCLUSIVE OR gate 44. The figure also shows an example of the deskewing network 45, which employs T-type flip-flops 47 rather than the D-type flip-flops 39 in the deskewing network 38 of FIG. 8.

Figure 11A:
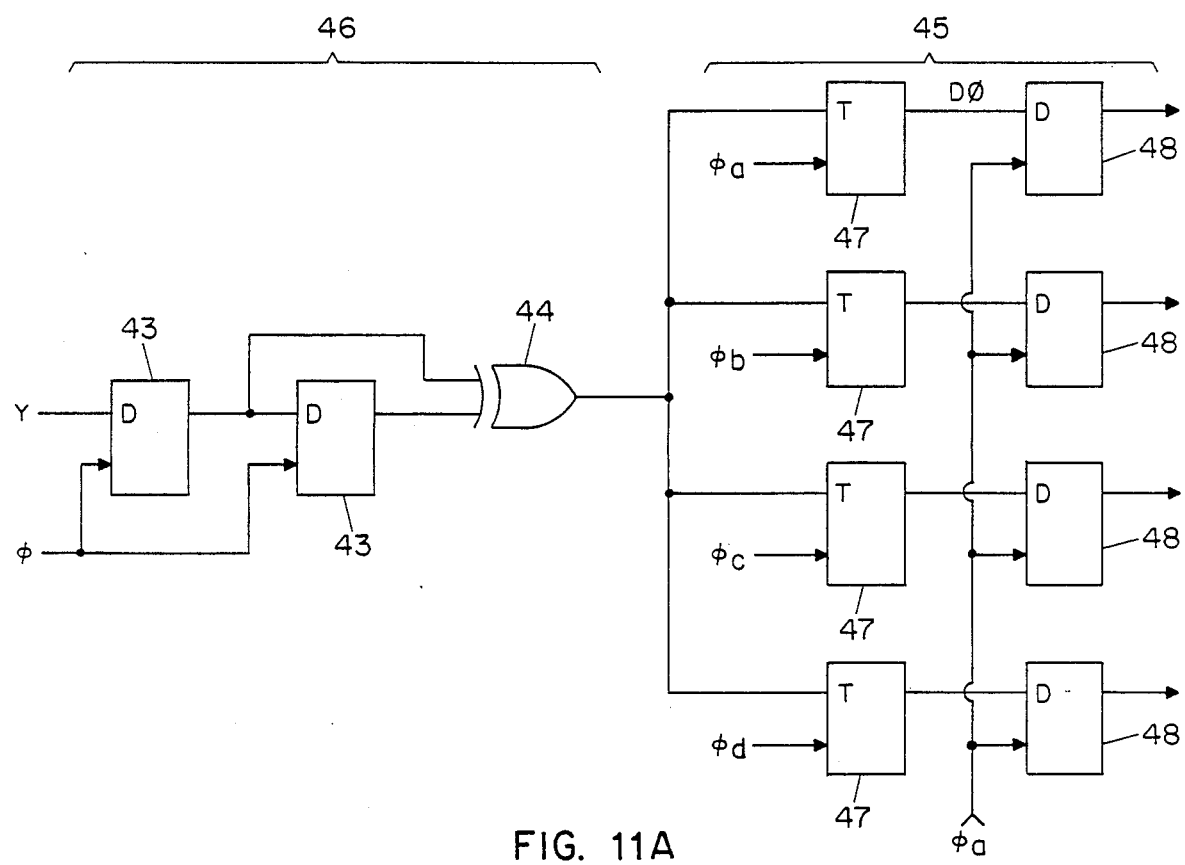
FIG. 11A shows schematic diagrams of examples of a midcoder network and a deskewing network suitable for use in the time-division-multiplexed serial data transmission system of FIGS. 10A and 10B.
Figure 11B:
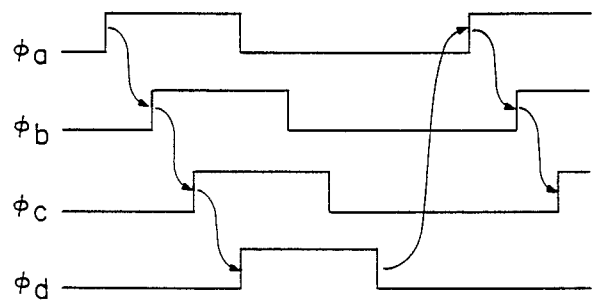
FIG. 11B depicts the waveforms of the clock signals for the deskewing network of FIG. 11A.

The relationship between the signals $\phi$, $\phi a$, $\phi b$, $\phi c$, and $\phi d$ of FIG. 11a is shown in FIG. 11b.

In the demultiplexer 37 of FIG. 7, as shown in detail in FIG. 8, there is no need for high-speed flip-flops. Nothing in the deskewing network 38 of either FIGS. 7 or 9 need to latch and settle more quickly than the relatively slow-speed clock signals $\phi a$–$\phi d$. It is, however, necessary to derive a clock signal from incoming data stream Y and to divide the derived clock signal to obtain the slow-speed clocks $\phi a$–$\phi d$. The clock signals $\phi a$–$\phi d$ distributed to the flip-flops 39 and 40 are all relatively slow-speed signals. As discussed above, the time-division multiplexer 36 likewise does not require high-speed clock signals or high-speed flip-flops.

In the serial data transmission systems 900 and 1000 of FIGS. 9 and 10A, respectively, it may be seen that the multiplexer 901, 1001 likewise does not require high-speed clock signals or flip-flops.

In the demultiplexer 902 of FIG. 9, the deskewing network 38, as mentioned above, contains nothing that must latch more quickly than the relatively slow-speed clock signals $\phi a$–$\phi d$. As mentioned above it is, however, necessary to either derive a clock from incoming data stream Y or receive one or more clock signals from the data source and to divide the derived clock signal to obtain the relatively slow-speed clock signals $\phi a$–$\phi d$. The postcoder 42 runs at a relatively slow (parallel) speed.

In the demultiplexer 1002 of FIG. 10A, the midcoder 46 does have flip-flops 43 running at the relatively high speed of the incoming data stream, while the deskewing network 45 requires either deriving of a clock signal from the incoming data stream, or receiving one or more clock signals from the data source. In this embodiment, the advantages offered by the invention are primarily in the multiplexer where no high-speed latches or clock signals are necessary.

Figure 10B:
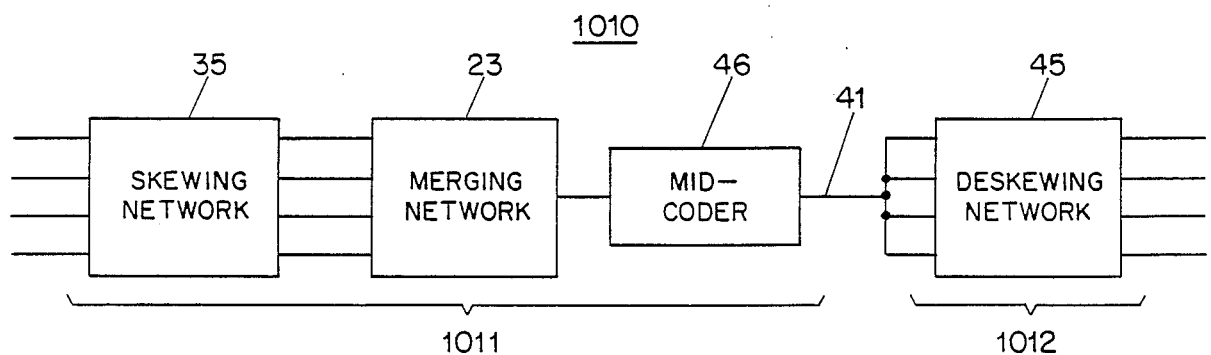
FIG. 10B shows a functional block diagram of a modification of the time-division-multiplexed serial data transmission system of FIG. 10A.

Referring now to FIG. 10B, there is shown a modification 1010 of the data transmission system of FIG. 10A, in which the midcoder 46 is included as part of the multiplexer 1011, and the demultiplexer 1012 includes only the deskewing network 45. Examples of the circuits for the midcoder 46 and the deskewing network 45, and the waveforms of the clock signals $\phi a$–$\phi d$, as used in the system of FIG. 10B are the same as those shown in FIGS. 11A and 11B, respectively.

I claim:

1. A time-division multiplexer having a plurality of first conductors each for receiving a respective input signal having a first or second state, the state of each input signal changing no more frequently than a first periodic rate having a first period, and having an output conductor for providing a time-division-multiplexed signal derived from the input signals of the first conductors, comprising:

precoding means having a plurality of sequentially ordered channels, including a first, second and last channel, each one of the channels corresponding to a particular one of the first conductors, and a plurality of second conductors each corresponding to a particular one of the channels, each of the channels, except for the first channel, providing to its corresponding second conductor a signal having a first or second state, the signal being inverted from a present state to another state whenever the state of the input signal of the corresponding first conductor and the state of the input signal of the first conductor of a preceding channel differ, and the first channel providing to its corresponding second conductor a signal having a first or second state, the signal being inverted from a present state to another state whenever the state of the input signal of the corresponding first conductor during a current first period and the input signal of the first conductor corresponding to the last channel during a preceding first period differ;

skewing means receiving the signals of the second conductors and operatively connected to a plurality of third conductors each corresponding to a particular one of the second conductors, the skewing means sampling the signal of each of the second conductors at the first periodic rate and supplying samples of the signal of each second conductor to a corresponding third conductor, the sampling of the signal of each of the second conductors, except for the second conductor corresponding to the first channel being skewed by a common predetermined interval with respect to the sampling of the signal of the second conductor corresponding to a preceding channel; and merging means having an output operatively coupled to the output conductor and a plurality of inputs operatively coupled to corresponding third conductors, and being responsive to the samples of the signal of each of the third conductors for providing at the output conductor an output signal having a first or second state, the output signal changing from a present state to another state whenever any one of the skewed sampled signals of the third conductors changes its state, wherein the merging means provides substantially equal propagation delays between each input and the output thereof.

2. A time-division multiplexer according to claim 1, wherein each channel of the precoding means comprises an EXCLUSIVE OR gate and a toggle flip-flop, the EXCLUSIVE OR gate of each channel having a first input operatively coupled to receive the input signal of a corresponding first conductor and an output operatively coupled to an input of the toggle flip-flop of the corresponding channel, the EXCLUSIVE OR gate of each of the channels, except the first channel, having a second input operatively coupled to receive the input signal of the first conductor corresponding to a preceding channel, the EXCLUSIVE OR gate of the first channel having a second input operatively coupled to an output of a delay flip-flop having an input operatively coupled to receive the input signal of the first conductor corresponding to the last channel, each of the toggle flip-flops and the delay flip-flop receiving a clock signal having the first period, the toggle flip-flop of each channel having an output operatively coupled to a corresponding one of the second conductors.

3. A time-division multiplexer according to claim 1, wherein the skewing means comprises a plurality of delay flip-flops, each corresponding to a respective one of the channels and having an input operatively coupled to a corresponding one of the second conductors and an output operatively coupled to a corresponding one of the third conductors, each of the delay flip-flops receiving a respective clock signal having the first period, the clock signal received by the delay flip-flop corresponding to each channel, except the first channel, being delayed by the common predetermined interval from the clock signal received by the delay flip-flop corresponding to a preceding channel.

4. A time-division multiplexer according to claim 1, wherein the merging means comprises a binary tree of EXCLUSIVE OR gates each having substantially the same propagation delay.

5. A time-division multiplexer having a plurality of first conductors each for receiving a respective input signal, each input signal having a first or a second state, the state of each input signal changing no more frequently than a first periodic rate having a first period, and an output conductor for providing a time-division-multiplexed signal derived from the input signals of the first conductors, comprising:

precoding means having a plurality of sequentially ordered channels, including a first, second and last channel, each one of the channels corresponding to a particular one of the first conductors, and a plurality of second conductors each corresponding to a particular one of the channels, each of the channels, except the first channel, providing to its corresponding second conductor a signal having a first or second state, the signal being inverted from a present state to another state whenever the state of the input signal of the corresponding first conductor and the state of the input signal of the first conductor corresponding to a preceding channel differ, and the first channel providing to its corresponding second conductor a signal having a first or second state, the signal provided by the first channel being inverted from a present state to another state whenever the state of the input signal of the corresponding first conductor and the parity of the signals of the second conductors differ during the same time interval;

skewing means receiving the signals of the second conductors and operatively connected to a plurality of third conductors each corresponding to a particular one of the second conductors, the skewing means sampling the signal of each of the second conductors at respective periodic sampling intervals equal to the first periodic rate and supplying samples of the signals of the second conductors to corresponding third conductors, the sampling intervals of the signal of each of the second conductors being skewed by a common predetermined interval with respect to the sampling intervals of the signal of the second conductor corresponding to a preceding channel; and merging means having an output operatively coupled to the output conductor and a plurality of inputs operatively coupled to corresponding third conductors, and being responsive to the samples of the signal of each of the third conductors for providing at the output conductor an output signal having a first or second state, the output signal changing from a present state to another state whenever any one of the skewed sampled signals at the third conductors changes its state, wherein the merging means provides substantially the same propagation delay between each input and the output thereof.

6. A time-division multiplexer according to claim 5, wherein each channel of the precoding means comprises an EXCLUSIVE OR gate and a T-type flip-flop, the EXCLUSIVE OR gate of each channel having a first input operatively coupled to receive the input signal of a corresponding first conductor and an output operatively coupled to a T input of the T-type flip-flop of the corresponding channel, the EXCLUSIVE OR gate of each of the channels, except the first channel, having a second input operatively coupled to receive the input signal of the first conductor of a preceding channel, the EXCLUSIVE OR gate of the first channel having a second input operatively coupled to an output of a parity circuit, the parity circuit having a plurality of inputs each operatively coupled to receive the signal of a respective one of the second conductors, each of the T-type flip-flops receiving a clock signal having the first period, the T-type flip-flop of each channel having an output operatively coupled to a corresponding one of the second conductors.

7. A time-division multiplexer according to claim 5, wherein the skewing means comprises a plurality of delay flip-flops, each corresponding to a respective one of the channels and having an input operatively coupled to a corresponding one of the second conductors and an output operatively coupled to a corresponding one of the third conductors, each of the delay flip-flops receiving a respective clock signal having the first period, the clock signal received by the delay flip-flop corresponding to each channel, except the first channel, being delayed by the common predetermined interval from the clock signal received by the delay flip-flop corresponding to a preceding channel.

8. A time-division multiplexer of claim 5, wherein the merging means comprises a binary tree of EXCLUSIVE OR gates each having substantially the same propagation delay.

9. A serial data transmission system comprising a time-division multiplexer and a time-division demultiplexer for coupling by a serial data path, the multiplexer having a plurality of sequentially ordered input conductors, including a first, second and last input conductor, each for receiving a respective input signal having a first or second state, the state of each input signal changing no more frequently than a first periodic rate having a first period, and having an output conductor operatively coupled to the serial data path for providing a time-division-multiplexed signal derived from the input signals received by the input conductors, the multiplexer comprising:

skewing means for receiving the input signals of the input conductors and operatively coupled to a plurality of second conductors each corresponding to a particular one of the input conductors, the skewing means sampling the input signal of each of the input conductors during respective periodic sampling intervals equal to the first periodic rate and supplying samples of the input signals of the input conductors to corresponding second conductors, the sampling interval of the input signal of each of the input conductors, except the first input conductor, being skewed by a common predetermined interval with respect to the sampling interval of the input signal of a preceding input conductor; and merging means having an output operatively coupled to the output conductor and a plurality of inputs operatively coupled to corresponding second conductors, and being responsive to the signals of the second conductors for providing at the output conductor an output signal having a first or second state, the output signal changing from a present state to another state whenever any one of the signals of the second conductors changes its state, wherein the merging means provide substantially the same propagation delay between each input and the output thereof; the demultiplexer having an input conductor operatively coupled to receive the time-division-multiplexed signal from the serial data path and a plurality of output conductors for providing respective signals derived from the time-division-multiplexed signal received by the input conductor, the demultiplexer comprising:

deskewing means operatively coupled to receive the time-division- multiplexed signal of the input conductor and operatively coupled to a plurality of third conductors and having a plurality of sequentially ordered sampling means each corresponding to a particular one of the third conductors, each of the sampling means providing to its corresponding third conductor samples of the signal of the input conductor taken during respective periodic sampling intervals equal to the first periodic rate, the sampling intervals for samples provided to each third conductor being skewed by the common predetermined interval with respect to the sampling interval for samples provided to the third conductor corresponding to a preceding sampling means; and postcoding means having a plurality of sequentially ordered channels, including a first, second and last channel, each corresponding to a particular one of the third conductors, and a plurality of output conductors each corresponding to a particular one of the channels, each of the channels, except the first channel, providing to its corresponding output conductor a signal having a first or second state, the signal provided to the corresponding channel being inverted from a present state to another state whenever the state of the signal of the corresponding third conductor and the state of the signal of the third conductor corresponding to a preceding channel differ during the same sampling interval, and the first channel providing to its corresponding output conductor a signal having a first or second state, the signal provided by the first channel being inverted from a present state to another state whenever the state of the signal at the corresponding third conductor during a sampling interval and the signal at the third conductor corresponding to the last channel during a preceding sampling interval differ.

10. A serial data transmission system according to claim 9, wherein the deskewing means of the demultiplexer comprises:

a plurality of first delay flip-flops each having an input operatively coupled to receive the time-division multiplexed signal of the input conductor, a clock input for receiving a respective clock signal and an output conductor; and a plurality of second delay flip-flops each corresponding to a respective one of the output conductors of the demultiplexer, each second delay flip-flop having an input operatively coupled to the output of a corresponding one of the first delay flip-flops, a clock input for receiving a common clock signal and an output operatively coupled to a corresponding one of the third conductors, the first delay flip-flops being sequentially ordered and include a first, second and last flip-flop, the respective clock signals received by the first delay flip-flops each having the first period and the respective clock signal received by each first delay flip-flops, except the first one, being delayed from the clock signal received by a preceding first delay flip-flop by the common predetermined interval, the clock signal received by each of the second delay flip-flops being the same as the clock signal received by the first one of the first delay flip-flops.

11. A time-division multiplexer according to claim 9, the merging means is a binary tree of EXCLUSIVE OR gates each having substantially the same propagation delay.

12. A serial data transmission system comprising a time-division multiplexer and a time-division demultiplexer for coupling by a serial data path, the multiplexer having a plurality of sequentially ordered input conductors including a first, second and last input conductor, each for receiving a respective input signal having a first or second state, the state of each input signal changing no more frequently than a first periodic rate having a first period, and having an output conductor operatively coupled to the serial data path for providing a time-division-multiplexed signal derived from the input signals of the first conductors, the multiplexer comprising:

skewing means for receiving the signals of the input conductors and operatively coupled to a plurality of second conductors, each second conductor corresponding to a particular one of the input conductors, the skewing means sampling the input signal of each of the input conductors at respective periodic sampling intervals equal to the first periodic rate and supplying samples of the input signals of the input conductors to corresponding second conductors, the sampling intervals of the input signal of each of the input conductors, except the first input conductor, being skewed by a common predetermined interval with respect to the sampling intervals of the input signal of a preceding input conductor; and merging means having an output operatively coupled to the output conductor and a plurality of inputs operatively coupled to corresponding second conductors, and being responsive to the signals of the second conductors for providing at the output conductor an output signal having a first or second state, the output signal changing from a present state to another state whenever any one of the signals of the second conductors changes its state, wherein the merging means provide substantially the same propagation delay between each input and the output thereof; the demultiplexer having an input conductor operatively coupled to receive the time-division-multiplexed signal from the serial data path and having a plurality of output conductors for providing respective signals derived from the time-division-multiplexed signal of the input conductor, the time-division-multiplexed signal having a first or a second state and changing its state no more frequently than a second periodic rate having a second period, the demultiplexer comprising:

midcoding means operatively coupled to receive the signal of the input conductor of the demultiplexer and operatively coupled to a third conductor for sampling the input signal of the input conductor of the demultiplexer at periodic sampling intervals at the second periodic rate and providing to the third conductor a signal having a first or second state, the signal provided to the third conductor being of one state whenever the state of the input signal at the input conductor of the demultiplexer during a sampling interval and the signal at the input conductor during a preceding sampling interval differ, and the signal provided to the third conductor being otherwise of another state; and deskewing means operatively coupled to receive the signal of the third conductor and operatively coupled to the plurality of output conductors, the deskewing means having a plurality of sequentially ordered sampling means, including a first, second and last sampling means, each corresponding to a particular one of the output conductors, each of the sampling means for sampling the signal on the third conductor at periodic intervals at a rate equal to the second periodic rate divided by the number of output conductors, and providing to its corresponding output conductor a signal having a first or second state, the signal provided to the output conductor being inverted from a present state to another state whenever the signal of the third conductor during a sampling interval is in a particular one of the first or second states, the sampling intervals of each of the sampling means being skewed by the common predetermined interval from the sampling intervals of a preceding sampling means.

13. A serial data transmission system according to claim 12, wherein the midcoding means comprises:

a first delay flip-flop having an input operatively coupled to the input conductor of the demultiplexer, a clock input for receiving a clock signal and an output;

a second delay flip-flop having an input operatively coupled to the output of the first delay flip-flop, a clock input for receiving a clock signal and an output; and an EXCLUSIVE OR gate having an input operatively coupled to the output of the first delay flip-flop, a second input operatively coupled to the output of the second delay flip-flop and an output operatively coupled to the third conductor, the first and second delay flip-flops both receiving a clock signal of the second periodic rate.

14. A serial data transmission system according to claim 12, wherein the deskewing means comprises:

a plurality of toggle flip-flops each corresponding to a respective one of the output conductors and having an input operatively coupled to the third conductor, a clock input for receiving a respective clock signal and an output; and a plurality of delay flip-flops each corresponding to a respective one of the output conductors and having an input coupled to the output of a corresponding one of the toggle flip-flops, a clock input for receiving a common clock signal and an output operatively coupled to a corresponding one of the output conductors, the toggle flip-flops being sequentially ordered and having a first, second and last flip-flop, and the clock signal received by each toggle flip-flop having a frequency equal to the second periodic rate divided by the number of output conductors of the demultiplexer and being skewed with respect to the clock signal received by a preceding toggle flip-flop by the common predetermined interval.

15. The serial data transmission system of claim 12, wherein the merging means of the multiplexer is a binary tree of EXCLUSIVE OR gates each having substantially the same propagation delay.

16. A serial data transmission system comprising a time-division multiplexer and a time-division demultiplexer for coupling by a serial data path, the multiplexer having a plurality of sequentially ordered input conductors including a first, second and last input conductor, each for receiving a respective input signal having a first or second state, the state of each input signal changing no more frequently than a first periodic rate having a first period, and having an output conductor operatively coupled to the serial data path for providing a time-division-multiplexed signal derived from the input signals of the first conductors, the multiplexer comprising:

skewing means for receiving the signals of the input conductors and operatively coupled to a plurality of second conductors, each second conductor corresponding to a particular one of the input conductors, the skewing means sampling the input signal of each of the input conductors at respective periodic sampling intervals equal to the first periodic rate and supplying samples of the input signals of the input conductors to corresponding second conductors, the sampling intervals of the input signal of each of the input conductors, except the first input conductor, being skewed by a common predetermined interval with respect to the sampling intervals of the input signal of a preceding input conductor;

merging means having an output operatively coupled to the output conductor and a plurality of inputs operatively coupled to corresponding second conductors, and being responsive to the signals of the second conductors for providing at the output conductor an output signal having a first or second state, the output signal changing from a present state to another state whenever any one of the signals of the second conductors changes its state, wherein the merging means provide substantially the same propagation delay between each input and the output thereof; and midcoding means operatively coupled to receive the output signal of the output conductor and operatively coupled to a third conductor for sampling the output signal of the output conductor at periodic sampling intervals at the second periodic rate and providing to the third conductor a signal having a first or second state, the signal provided to the third conductor being of one state whenever the state of the output signal at the output conductor during a sampling interval and the output signal at the output conductor during a preceding sampling interval differ, and the signal provided to the third conductor being otherwise of another state, the demultiplexer having an input conductor operatively coupled to receive the time-division-multiplexed signal from the serial data path and having a plurality of output conductors for providing respective signals derived from the time-division-multiplexed signal of the input conductor, the time-division-multiplexed signal having a first or a second state and changing into state no more frequently than a second periodic rate having a second period the demultiplexer comprising:

deskewing means operatively coupled to receive the signal of the input conductor and operatively coupled to the plurality of output conductors, the deskewing means having a plurality of sequentially ordered sampling means, including a first, second and last sampling means, each corresponding to a particular one of the output conductors, each of the sampling means for sampling the signal on the third conductor at periodic intervals at a rate equal to the second periodic rate divided by the number of output conductors, and providing to its corresponding output conductor a signal having a first or second state, the signal provided to the output conductor being inverted from a present state to another state whenever the signal of the third conductor during a sampling interval is in a particular one of the first or second states, the sampling intervals of each of the sampling means being skewed by the common predetermined interval from the sampling intervals of a preceding sampling means.

* * * * *